(12) United States Patent
Chen

(10) Patent No.: US 12,113,441 B2
(45) Date of Patent: Oct. 8, 2024

(54) POWER SOURCE EQUIPMENT AND POWER SUPPLY CONTROL METHOD

(71) Applicant: REALTEK SEMICONDUCTOR CORPORATION, Hsinchu (TW)

(72) Inventor: Chien Sheng Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/175,490

(22) Filed: Feb. 27, 2023

(65) Prior Publication Data

US 2023/0283180 A1 Sep. 7, 2023

(30) Foreign Application Priority Data

Mar. 2, 2022 (TW) .................................. 111107597

(51) Int. Cl.
*H02M 3/156* (2006.01)
*H02M 3/155* (2006.01)
(52) U.S. Cl.
CPC .................................. *H02M 3/155* (2013.01)
(58) Field of Classification Search
None
See application file for complete search history.

(56) References Cited

U.S. PATENT DOCUMENTS

| | | | | |
|---|---|---|---|---|
| 9,281,691 | B2* | 3/2016 | Ferentz | H02J 4/00 |
| 9,660,456 | B2* | 5/2017 | Dwelley | H04L 12/40045 |
| 9,929,866 | B2* | 3/2018 | Darshan | H04L 12/10 |
| 10,523,448 | B2* | 12/2019 | Tarn | H04B 3/54 |
| 11,418,355 | B2* | 8/2022 | Li | H04L 12/10 |
| 2006/0239183 | A1 | 10/2006 | Robitaille et al. | |
| 2008/0238447 | A1 | 10/2008 | de la Torre Vega et al. | |

FOREIGN PATENT DOCUMENTS

CN 101860443 B 1/2013

OTHER PUBLICATIONS

Office Action of Taiwan counterpart application 111107597 dated Nov. 24, 2022.
English abstract translation of office Action of Taiwan counterpart application 111107597 dated Nov. 24, 2022.
English abstract translation of CN101860443B.

* cited by examiner

*Primary Examiner* — Jeffrey S Zweizig
(74) *Attorney, Agent, or Firm* — WPAT, P.C.; Anthony King

(57) ABSTRACT

A power source equipment is configured to provide a power to a powered device in a power over Ethernet. The power source equipment includes a first port, a second port, and a control circuit. The first port is configured to perform a power classification on the powered device, and provide a first voltage to the powered device in a first stage. The second port is configured to provide a second voltage to the powered device in a second stage. The control circuit is configured to disable the second port in the first stage, and configured to control the second port to output the second voltage and increase the first voltage in the second stage.

19 Claims, 3 Drawing Sheets

POWER SOURCE EQUIPMENT AND POWER SUPPLY CONTROL METHOD

CROSS-REFERENCE TO RELATED APPLICATIONS

This application claims the benefit of priority to Patent Application No. 11107597, filed in Taiwan on Mar. 3, 2022, which is incorporated by reference in its entirety.

TECHNICAL FIELD

The present application relates to a power source equipment and power supply control method, particularly to a single-signature power source equipment and power supply control method.

BACKGROUND

In a power over Ethernet system, when the power source equipment takes too long to perform power classification on the powered device, the powered device may not be verified successfully. In turn, the power source equipment may not be able to supply power to the powered device properly. Therefore, the efficiency of performing power classification has become one of the issues of concern in the related field.

SUMMARY OF THE INVENTION

An aspect of the present disclosure provides a power source equipment (PSE) is configured to provide a power to a powered device (PD) in a power over Ethernet system (PoE). The PSE includes a first port, a second port, and a control circuit. The first port is configured to perform a power classification on the PD, and provide a first voltage to the PD in a first stage. The second port is configured to provide a second voltage to the powered device in a second stage. The control circuit is configured to disable the second port in the first stage, and configured to control the second port to output the second voltage and increase the first voltage in the second stage.

Another aspect of the present disclosure provides a power supply control method configured to control a PSE to supply a power to a PD in a PoE. The power supply control method includes operations of: in a first stage of the power supply control method, performing a power classification on the PD, and controlling a first port of the PSE to output a first voltage to the PD; disabling a second port of the PSE in the first stage; controlling the second port to output a second voltage to the PD in a second stage of the power supply control method; and increasing the first voltage in the second stage.

The PSE and the power supply control method of the present disclosure increase the speed that the current charges the capacitor in the PSE by adjusting the voltage so as to speed up the time of performing power classification.

BRIEF DESCRIPTION OF THE DRAWINGS

Various aspects of the present application can best be understood upon reading the detailed description below and accompanying drawings. It should be noted that the various features in the drawings are not drawn to scale in accordance with standard practice in the art. In fact, the size of some features may be deliberately enlarged or reduced for the purpose of discussion.

DETAILED DESCRIPTION

Figure 1:
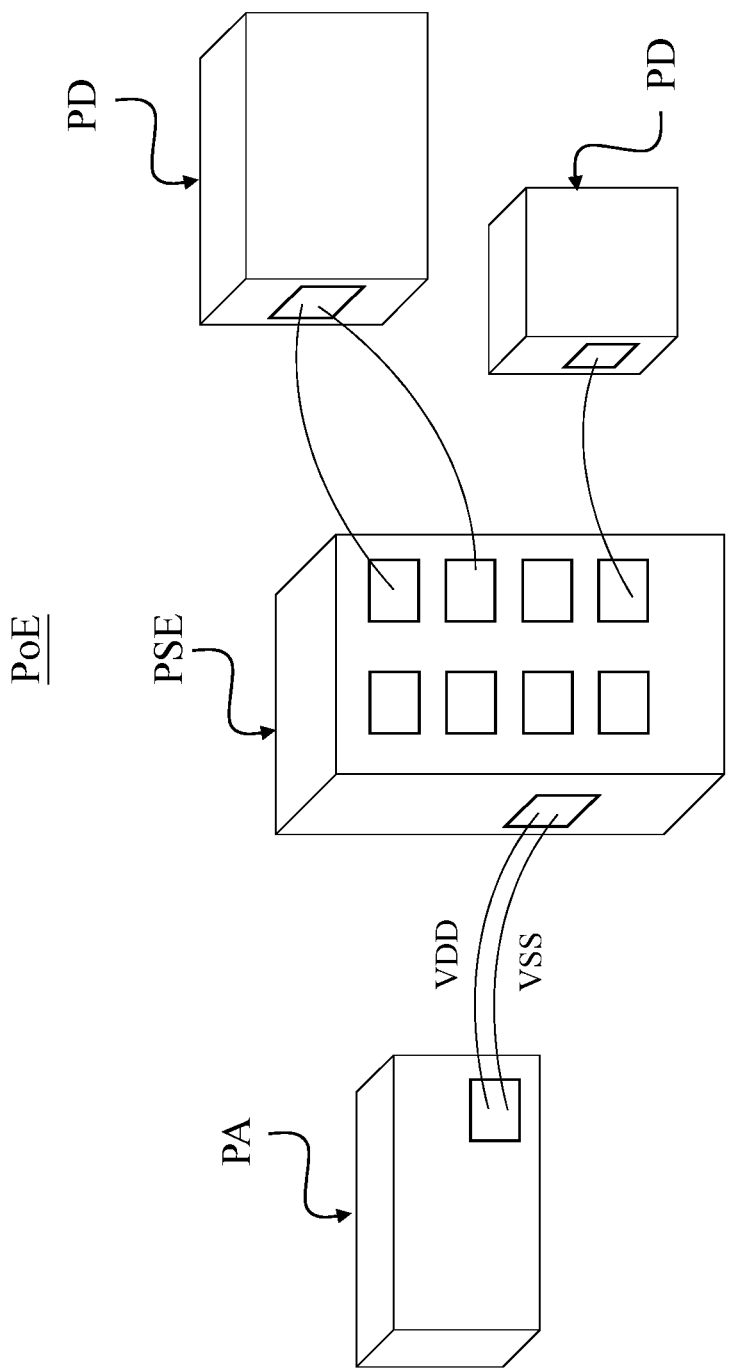
FIG. 1 is a schematic diagram of a power over Ethernet system in some embodiments of the present disclosure.

FIG. 1 is a schematic diagram of a power over Ethernet (PoE) in some embodiments of the present disclosure. The PoE includes a power source equipment (PSE), powered devices (PD) and an adapter (PA).

In the PoE, the network line is not only used to transmit Ethernet signals, but the PSE also provides power to the PD through the network line, so that the remote PD does not need to receive additional power. In some embodiments, the power consumption required by the PD is higher, and the PSE may not be able to satisfy the PD's power requirement when it only uses a port for transmission power. In this case, the PSE uses a single signature mode (also known as a single signature application) to provide power to the PD. Specifically, in the single signature mode, the PSE uses two (or more) ports to transmit power to the PD. For ease of illustration, the present disclosure is discussed in terms of the PSE using two ports to provide power to the PD. However, the present disclosure is not limited thereto, and using various numbers of ports to supply power to the PD is within the contemplated scope of the present disclosure.

The PA is configured to provide a supply voltage VDD, VSS to the PSE, e.g., to provide DC power with a voltage difference of 48 V between the supply voltage VDD and the supply voltage VSS. The PSE then uses the supply voltage VDD and VSS to supply power to the PD.

Figure 2:
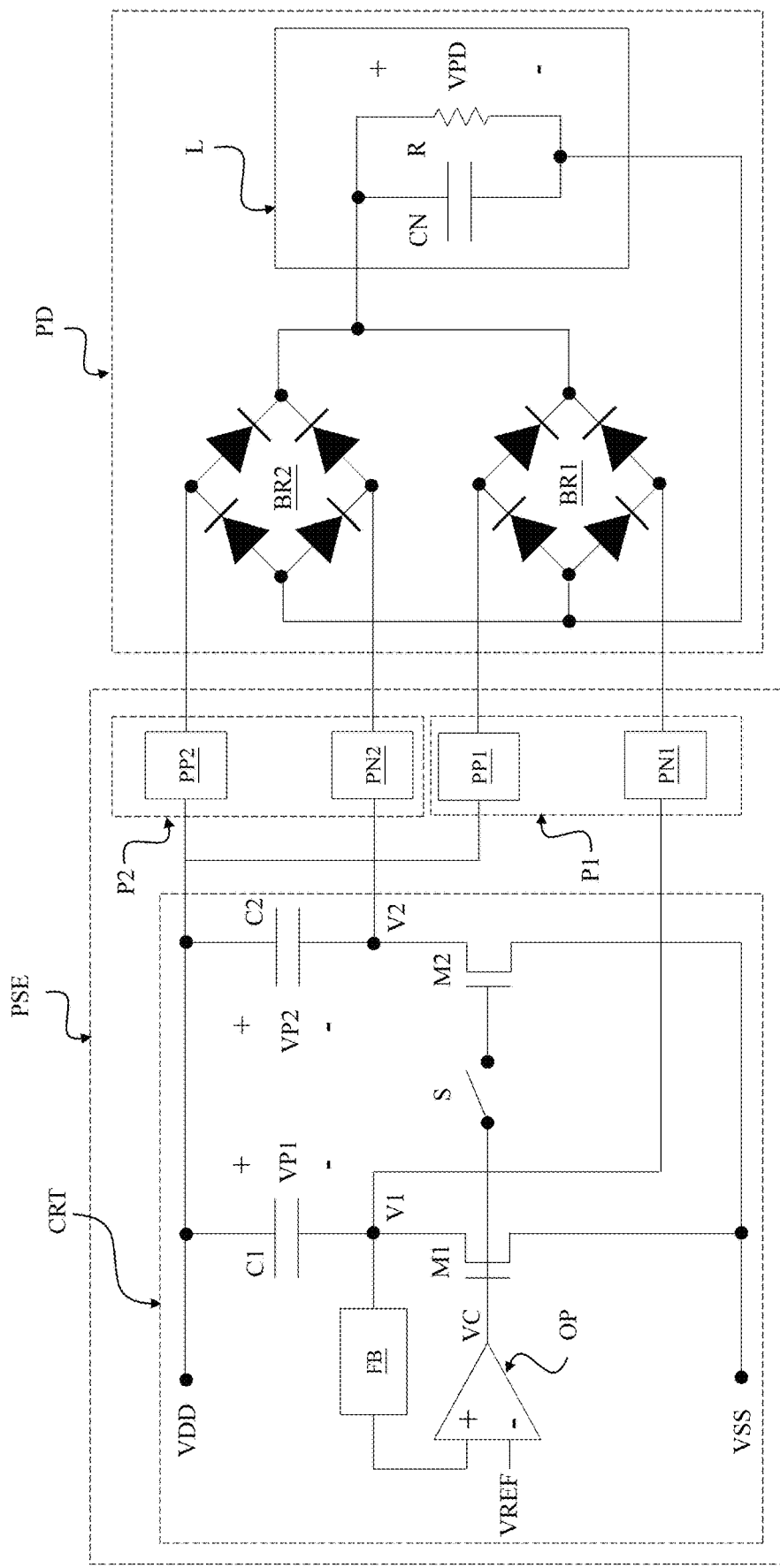
FIG. 2 is a schematic diagram of a power source equipment and a powered device in some embodiments of the present disclosure.

Reference is made to FIG. 2. FIG. 2 is a schematic diagram of the PSE and PD in some embodiments of the present disclosure. The PSE includes a plurality of ports and a control circuit CRT; in the present disclosure, only the first port P1 and the second port P2 are discussed, wherein the first port P1 and the second port P2 can be any two of the ports in the PSE. The control circuit CRT is coupled to the first port P1 and the second port P2, and configured to control the first port P1 and the second port P2 to supply power to the PD. The first port P1 and the second port P2 are respectively coupled to the PD through network lines.

The operation of the PSE before it supplies power to the PD can be divided into two stages T1 and T2. In the first stage T1, the PSE and the PD first perform power classification (also referred to as power detection). In the first stage T1, the PSE performs detection to the PD through the first port P1, and if the PD is validated successfully, then the operation proceeds to the second stage T2.

The first port P1 and the second port P2 are respectively configured to provide a voltage VP1 and a voltage VP2 to the PD. The first port P1 includes a positive terminal PP1 and a negative terminal PN1, wherein the positive terminal PP1 is configured to receive the supply voltage VDD and transmit the same to the PD, and the negative terminal PN1 is configured to receive a voltage V1 from the PD. The second port P2 includes a positive terminal PP2 and a negative terminal PN2, wherein the positive terminal PP2 is configured to receive the supply voltage VDD and transmit the same to the PD, and the negative terminal PN2 is configured to receive the voltage V2 from the PD. The voltage difference between the supply voltage VDD and the voltage V1 is the voltage VP1, and the voltage difference between the supply voltage VDD and the voltage V2 is the voltage VP2.

The control circuit CRT includes a capacitor C1, a capacitor C2, a transistor M1, a transistor M2, an amplifier OP, a feedback controller FB and a switch S. The capacitor C1 is coupled between the supply voltage VDD and a first terminal of the transistor M1; the feedback controller FB is coupled between a positive input terminal of the amplifier OP and the first terminal of the transistor M1; a negative input terminal of the amplifier OP is configured to receive a reference voltage VREF; an output terminal of the amplifier OP is coupled to a control terminal of the transistor M1; a second terminal of the transistor M1 is coupled to the supply voltage VSS; the capacitor C2 is coupled between the supply voltage VDD and a first terminal of the transistor M2; the output terminal of the amplifier OP is further coupled to a control terminal of the transistor M2 through the switch S; a second terminal of the transistor M2 is coupled to the supply voltage VSS. The first terminal of the transistor M1 is coupled to the negative terminal PN1, and configured to receive the voltage V1, and the first terminal of the transistor M2 is coupled to the negative terminal PN2, and configured to receive the voltage V2.

In some embodiments, the PD includes a bridge rectifier BR1 and a bridge rectifier BR2 connected across a load L. For ease of understanding, the load L s represented by an RC circuit including a capacitor CN and a resistor R. The bridge rectifier BR1 is configured to receive the supply voltage VDD and output the first voltage; the bridge rectifier BR2 is configured to receive the supply voltage VDD and output the second voltage. When the first port P1 supplies power to the PD, a voltage VPD on the load L is equal to the voltage VP1. Similarly, when the second port P2 supplies power to the PD, the voltage VPD on the load L is equal to the voltage VP2. When the PSE supplying power to PD using the first port P1 and the second port P2 reaches a steady state, the voltages VP1, VP2 and VPD are equal.

In the first stage T1, the switch S is turned off, and thus, the transistor M2 is not conducted, the voltage VP2 crossing the capacitor C2 is 0, so that the second port P2 is disabled. The supply voltage VDD is transmitted from the positive terminal PP1 of the first port P1 to the PD to generate the voltage VPD on the load L. Next, the voltage V1 (=VDD-VPD) is transmitted to the first terminal of the transistor M1 from the bridge rectifier BR1 through the negative terminal PN1 of the first port P1. The feedback controller FB is configured to directly transmit the voltage V1 to the positive receiving terminal of the amplifier OP.

Figure 3:
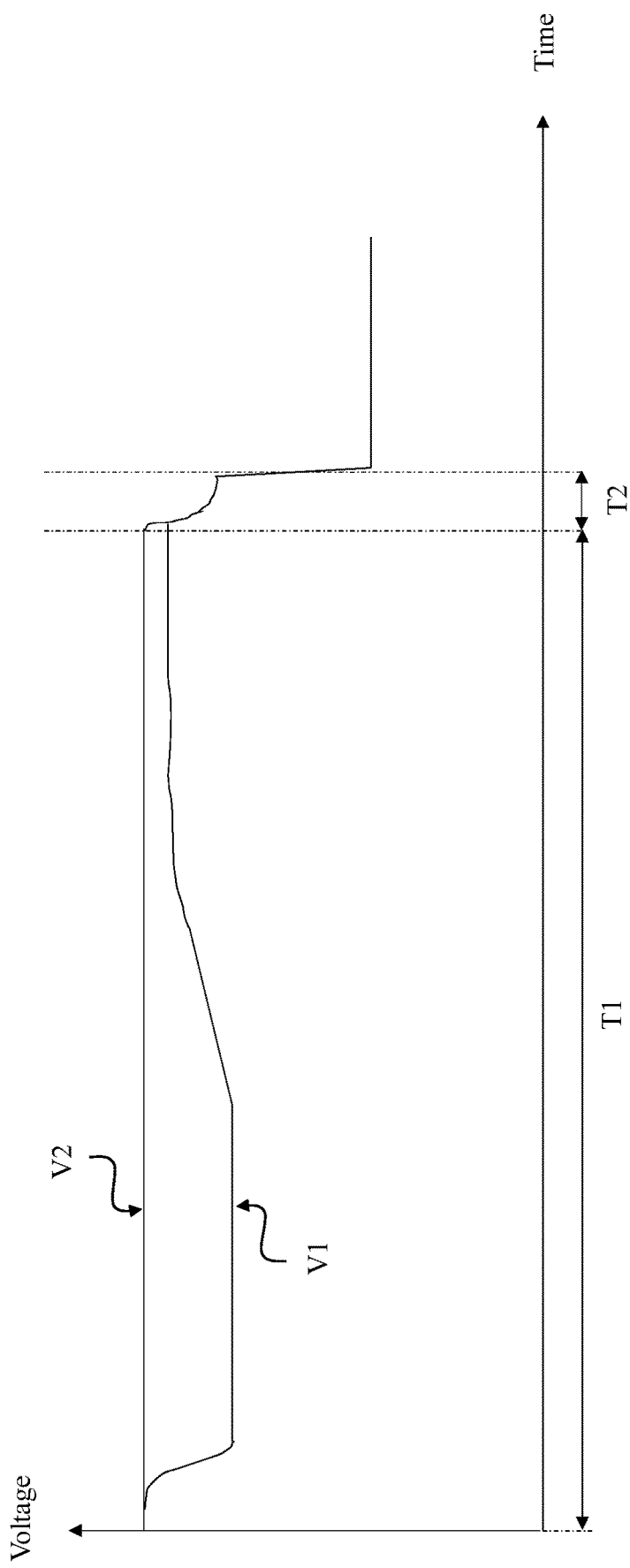
FIG. 3 is a waveform diagram of the voltage in a power source equipment in some embodiments of the present disclosure.

In the present disclosure, the voltage V1 is greater than the reference voltage VREF, and the amplifier OP generates a control voltage VC greater than 0; therefore, the transistor M1 is conducted. Reference is also made to FIG. 3. FIG. 3 is a waveform diagram of the voltage V1 and the voltage V2 in some embodiments of the present disclosure. When the transistor M1 is just conducted, the on-current is generated and transmitted from the first terminal of the transistor M1 to the second terminal coupled to the supply voltage VSS, so the voltage V1 at the first terminal of the transistor M1 is pulled down. Then, the first terminal of the transistor M1 (coupled to the capacitor CD gradually accumulates charges until the voltage of the capacitor C1 is equal to the predetermined voltage VP1 (as shown in the first stage T1 area in FIG. 3).

In the second stage T2, the switch S is conducted, and hence the transistor M2 is conducted, so that the second port P2 is enabled. The supply voltage VDD is transmitted from the positive terminal PP2 of the second port P2 to the PD to generate the voltage VPD on the load L. Next, the voltage (=VDD-VPD) is transmitted from the second port P2 of the bridge rectifier BR2 through the negative terminal PN2 of the second port P2. Similarly, when the transistor M2 is just conducted, the current is generated by the transistor M2 and transmitted to the terminal of the supply voltage VSS, so that the voltage V2 at the first terminal of the transistor M2 is pulled down. Then, the first terminal of the transistor M2 (coupled to the capacitor C2) gradually accumulates charges until the voltage of the capacitor C2 is equal to the predetermined voltage VP2 (as shown in the second stage T2 area in FIG. 3).

In some embodiments, in the second stage T2, the feedback controller FB directly transmits the voltage V1 to the positive receiving terminal of the amplifier OP. The amplifier OP generates the control voltage VC that is greater than 0, so the transistor M1 and the transistor M2 are conducted at the same time. Meanwhile, the control circuit CRT is configured to change the reference voltage VREF in the second stage T2, so that the voltage V1 at the first terminal of the transistor M1 decreases, thereby causing an instant increase of the voltage VP1 (the voltage VPD). In this case, the current flowing through the load L increases because the voltage VPD increases. In some embodiments, the transistor M1 and the transistor M2 have the same size and specification, and hence when the switch S is conducted, passing through the transistor M1 can be mirrored to the transistor M2.

Because the second port P2 is just enabled, the bridge rectifier BR2 in the PD has not yet been conducted, and the equivalent resistance from the load L to the bridge rectifier BR1 is relatively low, so the ratio of the current on the load L being transmitted to the first terminal of the transistor M2 is smaller. Therefore, it takes less time for the control circuit CRT to accumulate the charges on the first terminal of the transistor M2 to the voltage of capacitor C2 equal to the voltage VP2. However, by instantaneously increasing the voltage VP1 (i.e., decreasing the voltage V1), additional mirroring current can be generated on the transistor M2, which accelerates charges accumulation at the first terminal of the transistor M2 and decelerates this operation.

In some embodiments, the control circuit CRT increases the reference voltage VREF to raise the voltage VP1 in the second stage T2. However, the present disclosure is not limited thereto. According to different types of transistor M1 and/or amplifier OP, the control circuit CRT can also decrease the reference voltage VREF to increase the voltage VP1 in the second stage T2.

In other embodiments, the control circuit CRT does not adjust the reference voltage VREF in the second stage, but raises the voltage V1 to the voltage V3 using the feedback controller FB, and transmits the voltage V3 to the positive receiving terminal of the amplifier OP. Similar to the embodiments in which the reference voltage VREF is adjusted, the control circuit CRT decreases the voltage V3 to the voltage V1 and transmits the same to the positive receiving terminal of the amplifier OP such that the voltage V1 on the first terminal of the transistor M1 decreases, so as to instantaneously increase the current passing through the transistor M1, thereby increasing the current passing through the transistor M2.

When the first terminal of the transistor M2 accumulates sufficient charges such that the voltage on the capacitor C2 reaches a predetermined voltage VP2, the second stage T2 is completed and a stable state is achieved. In this case, the voltages VP1, VP2, VPD are the same.

The foregoing outlines features of several embodiments of the present application so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A power source equipment (PSE) configured to provide a power to a powered device (PD) in a power over Ethernet system (PoE), the power source equipment comprising:
    a first port configured to perform a power classification on the PD and output a first cross voltage to the PD in a first stage;
    a second port configured to output a second cross voltage to the PD in a second stage; and
    a control circuit configured to disable the second port in the first stage, and control the second port to output the second cross voltage and increase the first cross voltage in the second stage,
    wherein the control circuit comprises:
        a first transistor;
        a second transistor; and
        an amplifier,
    wherein
        a first terminal of the first transistor is configured to receive a first voltage from the PD through the first port, and a first terminal of the second transistor is configured to receive a second voltage from the PD through the second port,
        a control terminal of the first transistor and a control terminal of the second transistor are coupled to an output terminal of the amplifier,
        a second terminal of the first transistor and a second terminal of the second transistor are coupled to a second supply voltage, and
        a positive receiving terminal of the amplifier is coupled to the first terminal of the first transistor, and a negative receiving terminal is coupled to a first reference voltage or a second reference voltage.

2. The PSE of claim 1, wherein the first port has a first positive terminal and a first negative terminal, wherein in the first stage, the first positive terminal is configured to output a first supply voltage to the PD, and the first negative terminal is configured to receive the first voltage from the PD, wherein the first supply voltage and the first voltage form the first cross voltage between the first positive terminal and the first negative terminal.

3. The PSE of claim 2, wherein the second port has a second positive terminal and a second negative terminal, wherein in the second stage, the second positive terminal is configured to output the first supply voltage to the PD, and the second negative terminal is configured to receive the second voltage from the PD, wherein the first supply voltage and the second voltage form the second cross voltage between the first positive terminal and the first negative terminal.

4. The PSE of claim 3, wherein the control circuit comprises:
    a first capacitor,
    wherein the first capacitor is coupled between the first supply voltage and the first terminal of the first transistor.

5. The PSE of claim 4, wherein the control circuit further comprises:
    a second capacitor,
    wherein the second capacitor is coupled between the first supply voltage and the first terminal of the second transistor.

6. The PSE of claim 5, wherein the control circuit further comprises a switch coupled between the output terminal and the control terminal of the second transistor, configured to be turned off in the first stage to disable the second port, and be turned on in the second stage.

7. The PSE of claim 4, wherein the positive receiving terminal is configured to receive the first voltage, and the negative receiving terminal is configured to receive the first reference voltage in the first stage, and receive the second reference voltage in the second stage, wherein the second reference voltage is greater than the first reference voltage.

8. The PSE of claim 4, wherein the control circuit further comprises a feedback controller coupled between the positive receiving terminal and the first terminal of the first transistor, wherein the feedback controller is configured to directly transmit the first voltage to the positive receiving terminal in the first stage, and raise the first voltage of the positive receiving terminal to a third voltage in the second stage,
    wherein the negative receiving terminal is configured to receive the first reference voltage in the first stage and the second stage.

9. The PSE of claim 1, wherein the power classification adopts a single signature.

10. The PSE of claim 1, wherein the first voltage and the second voltage are the same after the second stage completes.

11. A power supply control method configured to control a power source equipment (PSE) to supply a power to a powered device (PD) in a power over Ethernet system (PoE), the power supply control method comprising:
    in a first stage of the power supply control method, performing a power classification on the PD, and controlling a first port of the PSE to output a first cross voltage to the PD, comprising:
        receiving, by a first terminal of a first transistor, a first voltage from the PD through a first negative terminal of the first port;
    disabling a second port of the PSE in the first stage;
    controlling the second port to output a second cross voltage to the PD in a second stage of the power supply control method, comprising:
        receiving, by a first terminal of a second transistor, a second voltage from the PD through a second negative terminal of the second port; and
    increasing the first cross voltage in the second stage, comprising:
        decreasing the first voltage, comprising:
            receiving a reference voltage by a negative receiving terminal of an amplifier; and
            outputting a control voltage by the amplifier to a control terminal of the first transistor and a control terminal of the second transistor,
            wherein a second terminal of the first transistor and a second terminal of the second transistor are coupled to a second supply voltage, a positive receiving terminal of the amplifier is coupled to the first terminal of the first transistor, and a negative receiving terminal is coupled to the reference voltage.

12. The power supply control method of claim 11, wherein the first cross voltage and the second cross voltage are the same after the second stage completes.

13. The power supply control method of claim 11, wherein controlling the first port of the PSE to output the first cross voltage to the PD comprises:
   transmitting a first supply voltage to the PD by a first positive terminal of the first port,
   wherein the first supply voltage and the first voltage form the first cross voltage between the first positive terminal and the first negative terminal.

14. The power supply control method of claim 13, wherein controlling the second port to output the second cross voltage to the PD in the second stage comprises:
   transmitting the first supply voltage to the PD by a second positive terminal of the second port,
   wherein the first supply voltage and the second voltage form the second cross voltage between the second positive terminal and the second negative terminal.

15. The power supply control method of claim 14, wherein in the step of disabling the second port of the PSE in the first stage, the second voltage is raised to the first supply voltage, so as to make the second cross voltage being 0 to disable the second port.

16. The power supply control method of claim 11, wherein decreasing the first voltage comprises:
   receiving a third voltage by the positive receiving terminal of an amplifier.

17. The power supply control method of claim 11, wherein decreasing the first voltage further comprises:
   directly outputting the first voltage to be the third voltage;
   raising the reference voltage to raise the control voltage; and
   pulling down the first voltage by the first transistor.

18. The power supply control method of claim 11, wherein decreasing the first voltage further comprises:
   decreasing, by a feedback controller, the first voltage to be the third voltage to raise the control voltage; and
   pulling down the first voltage by the first transistor.

19. The power supply control method of claim 11, wherein the power classification adopts a single signature.

* * * * *